United States Patent
Kostanic et al.

(10) Patent No.: US 8,914,022 B2
(45) Date of Patent: Dec. 16, 2014

(54) SYSTEM FOR PROVIDING HIGH SPEED COMMUNICATIONS SERVICE IN AN AIRBORNE WIRELESS CELLULAR NETWORK

(75) Inventors: Ivica Kostanic, Palm Bay, FL (US); Vahid Tarokh, Cambridge, MA (US); Harold Grant Saroka, Ashburn, VA (US); Joseph M. Cruz, Naperville, IL (US); William James Gordon, Washington, DC (US); Anand K. Chari, Bartlett, IL (US)

(73) Assignee: Gogo LLC, Itasca, IL (US)

( * ) Notice: Subject to any disclaimer, the term of this patent is extended or adjusted under 35 U.S.C. 154(b) by 1098 days.

(21) Appl. No.: 12/137,995

(22) Filed: Jun. 12, 2008

(65) Prior Publication Data
US 2008/0274734 A1    Nov. 6, 2008

(51) Int. Cl.
*H04W 4/00*   (2009.01)
*H04W 16/28*   (2009.01)
*H04B 7/185*   (2006.01)
*H04W 84/00*   (2009.01)

(52) U.S. Cl.
CPC ......... *H04B 7/18508* (2013.01); *H04W 84/005* (2013.01); *H04W 16/28* (2013.01)
USPC ........ 455/431; 455/427; 455/428; 455/432.1; 370/316; 370/331; 370/338

(58) Field of Classification Search
CPC ............... H04W 84/06; H04W 84/005; H07B 7/18502; H07B 7/18504; H07B 7/18506; H07B 7/18508; H07B 7/18513; H07B 7/15815; H07B 7/18517; H04B 1/04
USPC ............. 455/427, 428, 431, 432.1, 98, 188.1, 455/445; 370/331, 338
See application file for complete search history.

(56) References Cited

U.S. PATENT DOCUMENTS 3,659,085 A    4/1972   Potter et al.
4,115,777 A    9/1978   Taylor et al.
(Continued)

FOREIGN PATENT DOCUMENTS

WO    WO-98/10534 A1    3/1998
WO    WO-0146822 A1    6/2001
(Continued)

OTHER PUBLICATIONS

In the US Patent and Trademark Office in re: U.S. Appl. No. 07/847,920, Non-Final Office Action dated Jul. 30, 1993, number of pages unknown; and corresponding repsonse dated Oct. 26, 1993, number pages unknown.

(Continued)

*Primary Examiner* — Wayne Cai
(74) *Attorney, Agent, or Firm* — Marshall, Gerstein & Borun LLP; Randall G. Rueth (57) ABSTRACT

The present Broadband Link System supplements the existing Air-To-Ground Radio Frequency communications link with an additional, separate high speed Broadband Ground-To-Air Data Channel to provide additional data communication capacity for aircraft. This Broadband Ground-To-Air Data Channel is typically a uni-directional (Ground-To-Air) link directed via a focused beam to selected aircraft which are operational in the coverage area of the Broadband Ground-To-Air Data Channel. The routing of the various data transmissions on both the Air-To-Ground Radio Frequency communications link and the Broadband Ground-To-Air Data Channel are managed in a unified manner to maximize the utilization of the two transmission facilities.

26 Claims, 6 Drawing Sheets

(56) References Cited

U.S. PATENT DOCUMENTS

| | | | |
|---|---|---|---|
| 4,654,867 A | 3/1987 | Labedz et al. | |
| 5,042,027 A | 8/1991 | Takase et al. | |
| 5,123,112 A | 6/1992 | Choate | |
| 5,134,709 A | 7/1992 | Bi et al. | |
| 5,212,804 A | 5/1993 | Choate | |
| 5,408,515 A | 4/1995 | Bhagat et al. | |
| 5,432,841 A | 7/1995 | Rimer | |
| 5,459,469 A * | 10/1995 | Schuchman et al. | 342/37 |
| 5,519,761 A | 5/1996 | Gilhousen | |
| 5,543,779 A | 8/1996 | Aspesi et al. | |
| 5,555,444 A | 9/1996 | Diekelman et al. | |
| 5,590,395 A | 12/1996 | Diekelman | |
| 5,651,050 A | 7/1997 | Bhagat et al. | |
| 5,659,304 A | 8/1997 | Chakraborty | |
| 5,678,174 A | 10/1997 | Tayloe | |
| 5,740,535 A | 4/1998 | Rune | |
| 5,754,959 A | 5/1998 | Ueno et al. | |
| 5,805,683 A | 9/1998 | Berberich, Jr. | |
| 5,822,680 A | 10/1998 | Stuart et al. | |
| 5,826,188 A | 10/1998 | Tayloe et al. | |
| 5,832,380 A | 11/1998 | Ray et al. | |
| 5,839,053 A * | 11/1998 | Bosch et al. | 455/13.1 |
| 5,848,359 A | 12/1998 | Furtaw | |
| 5,887,258 A | 3/1999 | Lemozit et al. | |
| 5,925,092 A * | 7/1999 | Swan et al. | 701/531 |
| 5,950,129 A | 9/1999 | Schmid et al. | |
| 5,956,644 A | 9/1999 | Miller et al. | |
| 5,970,395 A | 10/1999 | Weiler et al. | |
| 5,978,653 A * | 11/1999 | Taylor et al. | 455/13.1 |
| 5,995,805 A | 11/1999 | Ogasawara et al. | |
| 5,995,833 A | 11/1999 | Zicker | |
| 6,002,944 A | 12/1999 | Beyda | |
| 6,009,330 A | 12/1999 | Kennedy, III et al. | |
| 6,040,781 A | 3/2000 | Murray | |
| 6,055,425 A | 4/2000 | Sinivaara et al. | |
| 6,104,926 A | 8/2000 | Hogg et al. | |
| 6,144,338 A | 11/2000 | Davies | |
| 6,195,529 B1 | 2/2001 | Linz et al. | |
| 6,201,797 B1 | 3/2001 | Leuca et al. | |
| 6,233,448 B1 | 5/2001 | Alperovich et al. | |
| 6,263,206 B1 | 7/2001 | Potochniak et al. | |
| 6,263,371 B1 | 7/2001 | Geagan, III et al. | |
| 6,304,762 B1 | 10/2001 | Myers et al. | |
| 6,314,286 B1 | 11/2001 | Zicker | |
| 6,317,435 B1 | 11/2001 | Tiedemann, Jr. et al. | |
| 6,321,084 B1 | 11/2001 | Horrer | |
| 6,324,398 B1 | 11/2001 | Lanzerotti et al. | |
| 6,353,734 B1 | 3/2002 | Wright et al. | |
| 6,392,692 B1 | 5/2002 | Monroe | |
| 6,393,281 B1 | 5/2002 | Capone et al. | |
| 6,418,327 B1 | 7/2002 | Carey et al. | |
| 6,430,412 B1 | 8/2002 | Hogg et al. | |
| 6,519,266 B1 | 2/2003 | Manning et al. | |
| 6,529,706 B1 * | 3/2003 | Mitchell | 455/12.1 |
| 6,545,601 B1 | 4/2003 | Monroe | |
| 6,546,426 B1 | 4/2003 | Post | |
| 6,567,052 B1 | 5/2003 | Wang et al. | |
| 6,567,408 B1 | 5/2003 | Li et al. | |
| 6,570,851 B1 | 5/2003 | Koskelainen et al. | |
| 6,577,419 B1 | 6/2003 | Hall et al. | |
| 6,580,915 B1 | 6/2003 | Kroll | |
| 6,614,774 B1 | 9/2003 | Wang | |
| 6,615,052 B1 | 9/2003 | Parmenter | |
| 6,643,496 B1 | 11/2003 | Shimoyama et al. | |
| 6,690,928 B1 | 2/2004 | Konishi et al. | |
| 6,700,902 B1 | 3/2004 | Meyer | |
| 6,735,438 B1 | 5/2004 | Sabatino | |
| 6,735,500 B2 | 5/2004 | Nicholas et al. | |
| 6,735,633 B1 | 5/2004 | Welch et al. | |
| 6,741,841 B1 | 5/2004 | Mitchell | |
| 6,754,489 B1 | 6/2004 | Roux et al. | |
| 6,757,712 B1 | 6/2004 | Bastian et al. | |
| 6,760,778 B1 | 7/2004 | Nelson et al. | |
| 6,788,935 B1 | 9/2004 | McKenna et al. | |
| 6,795,408 B1 | 9/2004 | Hiett | |
| 6,799,037 B1 | 9/2004 | Mielke et al. | |
| 6,810,527 B1 | 10/2004 | Conrad et al. | |
| 6,880,750 B2 | 4/2005 | Pentel | |
| 6,889,042 B2 | 5/2005 | Rousseau et al. | |
| 6,892,068 B2 | 5/2005 | Karabinis et al. | |
| 6,910,628 B1 | 6/2005 | Sehr | |
| 6,937,597 B1 | 8/2005 | Rosenberg et al. | |
| 6,944,169 B1 | 9/2005 | Yoshizawa et al. | |
| 6,948,003 B1 | 9/2005 | Newman et al. | |
| 6,963,292 B1 | 11/2005 | White | |
| 7,003,293 B2 | 2/2006 | D'Annunzio | |
| 7,027,801 B1 | 4/2006 | Hall et al. | |
| 7,050,755 B2 | 5/2006 | Kline | |
| 7,062,268 B2 | 6/2006 | McKenna | |
| 7,107,062 B2 | 9/2006 | Cruz et al. | |
| 7,131,136 B2 | 10/2006 | Monroe | |
| 7,280,535 B1 | 10/2007 | Bergman et al. | |
| 7,346,677 B1 | 3/2008 | Mohaban et al. | |
| RE40,476 E | 9/2008 | Leuca et al. | |
| 7,433,836 B1 | 10/2008 | August et al. | |
| 7,447,804 B2 | 11/2008 | Koo | |
| 7,486,690 B2 | 2/2009 | Maeda | |
| 7,526,762 B1 | 4/2009 | Astala et al. | |
| 7,599,691 B1 | 10/2009 | Mitchell | |
| 8,060,083 B2 | 11/2011 | Malosh | |
| 2002/0010633 A1 | 1/2002 | Brotherston | |
| 2002/0045444 A1 | 4/2002 | Usher et al. | |
| 2002/0059614 A1 | 5/2002 | Lipsanen et al. | |
| 2002/0082912 A1 | 6/2002 | Batachia et al. | |
| 2002/0090931 A1 | 7/2002 | Papineau et al. | |
| 2002/0123344 A1 | 9/2002 | Criqui et al. | |
| 2002/0155833 A1 | 10/2002 | Borel | |
| 2003/0032426 A1 | 2/2003 | Gilbert et al. | |
| 2003/0046118 A1 | 3/2003 | O'Donnell | |
| 2003/0046701 A1 * | 3/2003 | O'Donnell | 725/76 |
| 2003/0050746 A1 | 3/2003 | Baiada et al. | |
| 2003/0055975 A1 | 3/2003 | Nelson et al. | |
| 2003/0084108 A1 | 5/2003 | Syed | |
| 2003/0093187 A1 | 5/2003 | Walker | |
| 2003/0100315 A1 | 5/2003 | Rankin | |
| 2003/0103521 A1 * | 6/2003 | Raphaeli et al. | 370/445 |
| 2003/0109245 A1 | 6/2003 | McCalmont et al. | |
| 2004/0063433 A1 | 4/2004 | Garrison | |
| 2004/0102156 A1 | 5/2004 | Loner | |
| 2004/0102188 A1 | 5/2004 | Boyer et al. | |
| 2004/0137840 A1 | 7/2004 | La Chapelle et al. | |
| 2004/0142658 A1 | 7/2004 | McKenna et al. | |
| 2004/0152446 A1 | 8/2004 | Saunders et al. | |
| 2004/0203918 A1 | 10/2004 | Moriguchi et al. | |
| 2005/0053026 A1 * | 3/2005 | Mullan et al. | 370/316 |
| 2005/0071076 A1 | 3/2005 | Baiada et al. | |
| 2005/0088977 A1 | 4/2005 | Roch et al. | |
| 2005/0117586 A1 | 6/2005 | Ikeda et al. | |
| 2005/0216938 A1 | 9/2005 | Brady et al. | |
| 2005/0220055 A1 | 10/2005 | Nelson et al. | |
| 2005/0221875 A1 | 10/2005 | Grossman et al. | |
| 2005/0249217 A1 | 11/2005 | Maeda | |
| 2006/0009262 A1 | 1/2006 | Hamm | |
| 2006/0048196 A1 | 3/2006 | Yau | |
| 2006/0064746 A1 | 3/2006 | Aaron et al. | |
| 2006/0199532 A1 | 9/2006 | Soliman | |
| 2006/0229070 A1 | 10/2006 | de La Chapelle et al. | |
| 2006/0245363 A1 | 11/2006 | Ravindran et al. | |
| 2007/0021117 A1 | 1/2007 | McKenna et al. | |
| 2007/0042772 A1 | 2/2007 | Salkini et al. | |
| 2007/0064604 A1 | 3/2007 | Chen et al. | |
| 2007/0087756 A1 | 4/2007 | Hoffberg | |
| 2007/0105600 A1 | 5/2007 | Mohanty et al. | |
| 2007/0111725 A1 | 5/2007 | Kauffman et al. | |
| 2007/0161347 A1 * | 7/2007 | Ma et al. | 455/11.1 |
| 2007/0274294 A1 | 11/2007 | Sasaki et al. | |
| 2007/0281682 A1 | 12/2007 | Raju et al. | |
| 2008/0039076 A1 | 2/2008 | Ziarno et al. | |
| 2008/0070601 A1 | 3/2008 | Brueckheimer et al. | |
| 2008/0090546 A1 | 4/2008 | Dickinson et al. | |
| 2008/0212593 A1 | 9/2008 | Niska et al. | |
| 2008/0274734 A1 | 11/2008 | Kostanic et al. | |
| 2009/0016339 A1 | 1/2009 | Tanizawa et al. | |
| 2009/0080368 A1 | 3/2009 | Bengeult et al. | |

(56) References Cited

U.S. PATENT DOCUMENTS

| | | | |
|---|---|---|---|
| 2009/0144819 A1 | 6/2009 | Babbar et al. | |
| 2009/0185527 A1 | 7/2009 | Akhtar et al. | |
| 2010/0013703 A1 | 1/2010 | Tekawy et al. | |

FOREIGN PATENT DOCUMENTS

| | | |
|---|---|---|
| WO | WO-03/021868 A3 | 5/2003 |
| WO | WO-03/036917 A3 | 3/2004 |
| WO | WO-2006128946 A1 | 12/2006 |
| WO | WO-2008048742 A1 | 4/2008 |

OTHER PUBLICATIONS

In the US Patent and Trademark Office in re: U.S. Appl. No. 07/847,920, Non-Final Office Action dated Jan. 27, 1994, number of pages unknown; and corresponding response dated May 31, 1994, number of pages; and supplemental response dated Sep. 20, 1994, number of pages unknown.
In the US Patent and Trademark Office in re: U.S. Appl. No. 07/847,920, Non-Final Office Action dated Feb. 27, 1995, number pages unknown; and corresponding response dated May 24, 1995, number of pages unknown.
In the US Patent and Trademark Office in re: U.S. Appl. No. 07/847,920, Final Office Action dated Aug. 22, 1995, number of pages unknown.
In the US Patent and Trademark Office in re: U.S. Appl. No. 07/847,920, Final Office Action dated Mar. 21, 1996, number of pages unknown; and corresponding response dated Mar. 27, 1996, number of pages unknown.
In the US Patent and Trademark Office in re: U.S. Appl. No. 08/027,333, Non-Final Office Action dated Jun. 24, 1994, number of pages unknown; and corresponding response dated Dec. 22, 1994, number of pages unknown.
In the US Patent and Trademark Office in re: U.S. Appl. No. 08/709,417, Non-Final Office Action dated Feb. 18, 1998, number of pages unknown; and corresponding response dated Apr. 20, 1998, number of pages unknown.
In the US Patent and Trademark Office in re: U.S. Appl. No. 08/709,417, Final Office Action dated Jun. 11, 1998, number of pages unknown; and corresponding response dated Aug. 3, 1998, number of pages unknown.
In the US Patent and Trademark Office in re: U.S. Appl. No. 08/960,183, Non-Final Office Action dated Nov. 5, 1999, number of pages unknown; and corresponding response dated Dec. 6, 1999, number of pages unknown.
In the US Patent and Trademark Office in re: U.S. Appl. No. 09/379,825, Non-Final Office Action dated May 11, 2001, number of pages unknown; and corresponding response dated May 29, 2001, number of pages unknown.
In the US Patent and Trademark Office in re: U.S. Appl. No. 09/686,923, Non-Final Office Action dated Jul. 8, 2003, number of pages unknown; and corresponding response dated Sep. 29, 2003, number of pages unknown.
In the US Patent and Trademark Office in re: U.S. Appl. No. 09/686,923, Final Office Action dated Dec. 2, 2003, number of pages unknown; and corresponding response dated Jan. 9, 2004, number of pages unknown; and supplemental response dated Feb. 20, 2004, number of pages unknown.
In the US Patent and Trademark Office in re: U.S. Appl. No. 10/730,329, Non-Final Office Action dated May 18, 2005, 9 pages; and corresponding response dated Aug. 18, 2005, 34 pages.
In the US Patent and Trademark Office in re: U.S. Appl. No. 10/730,329, Final Office Action dated Nov. 25, 2005, 16 pages; and corresponding response dated Jan. 25, 2006, 32 pages; supplemental response dated Feb. 17, 2006, 31 pages; supplemental response dated Feb. 17, 2006, 28 pages; supplemental response dated Mar. 27, 2006, 21 pages; and supplemental response dated Apr. 14, 2006, 21 pages.
In the US Patent and Trademark Office in re: U.S. Appl. No. 11/492,545, Non-Final Office Action dated Aug. 7, 2008, 19 pages; and corresponding response dated Oct. 10, 2008, 29 pages.
In the US Patent and Trademark Office in re: U.S. Appl. No. 11/492,545, Final Office Action dated Dec. 19, 2008, 18 pages; and corresponding response dated Jan. 27, 2009, 34 pages; and supplemental response dated Apr. 17, 2009, 35 pages.
In the US Patent and Trademark Office in re: U.S. Appl. No. 11/492,545, Non-Final Office Action dated Jun. 10, 2009, 17 pages.
In the US Patent and Trademark Office in re: U.S. Appl. No. 11/590,146, Non-Final Office Action dated Sep. 24, 2008, 9 pages; and corresponding response dated Jan. 29, 2009, 13 pages.
In the US Patent and Trademark Office in re: U.S. Appl. No. 11/590,146, Final Office Action dated Mar. 31, 2009, 9 pages; and corresponding response dated May 29, 2009, 16 pages.
In the US Patent and Trademark Office in re: U.S. Appl. No. 12/021,133, Non-Final Office Action dated Jun. 18, 2009, 10 pages.
In the US Patent and Trademark Office in re: U.S. Appl. No. 12/182,834, Non-Final Office Action dated Jul. 8, 2009, 11 pages.
International Search Report issued Jul. 17, 2009 in co-pending application PCT/US2009/042788.
Li et al.; "Airborne Operation of Portable Electronic Devices"; IEEE Antenna's and Propagation Magazine; vol. 44, No. 4; Aug. 2002; pp. 30-39.
Papavramidis et al.; "Adaptation of Land Mobile Systems for Onboard Operation"; IEEE Conference; 1993; pp. 258-263.
Uhlirz; "Concept of a GSM-based Communication System for High-Speed Trains"; 1994 IEEE 44th Vehicular Technology Conference; Stockholm; Jun. 8-10, 1994; pp. 1130-1134.
Casewell, I.E.; "The Provision of GSM Cellular Radio Environments With Passenger Aircraft Operating Over Europe"; IEEE Fifth International Conference; Dec. 11-14, 1989; pp. 172-176.
In the US Patent and Trademark Office in re: U.S. Appl. No. 08/960,183, Non-Final Office Action dated Nov. 5, 1999.
In the US Patent and Trademark Office in re: U.S. Appl. No. 10/730,329, Final Office Action dated Nov. 25, 2005, 16 pages.
In the US Patent and Trademark Office in re: U.S. Appl. No. 11/414,873, Non-Final Office Action dated Oct. 15, 2009, 7 pages.
In the US Patent and Trademark Office in re: U.S. Appl. No. 11/492,545, Final Office Action dated Nov. 19, 2009, 19 pages.
In the US Patent and Trademark Office in re: U.S. Appl. No. 11/590,146, Final Office Action dated Mar. 15, 2010, 18 pages.
In the US Patent and Trademark Office in re: U.S. Appl. No. 11/590,146, Non-Final Office Action dated Sep. 15, 2009, 16 pages.
In the US Patent and Trademark Office in re: U.S. Appl. No. 12/021,125, Non-Final Office Action dated Jun. 10, 2010, 12 pages.
In the US Patent and Trademark Office in re: U.S. Appl. No. 12/021,169, Final Office Action dated Apr. 21, 2011, 12 pages.
In the US Patent and Trademark Office in re: U.S. Appl. No. 12/021,169, Final Office Action dated Jun. 8, 2010, 8 pages.
In the US Patent and Trademark Office in re: U.S. Appl. No. 12/021,169, Non-Final Office Action dated Jan. 15, 2010, 8 pages.
In the US Patent and Trademark Office in re: U.S. Appl. No. 12/021,169, Non-Final Office Action dated Jul. 14, 2009, 10 pages.
In the US Patent and Trademark Office in re: U.S. Appl. No. 12/021,169, Non-Final Office Action dated Nov. 10, 2010, 10 pages.
In the US Patent and Trademark Office in re: U.S. Appl. No. 12/029,298, Final Office Action dated Nov. 23, 2010, 11 pages.
In the US Patent and Trademark Office in re: U.S. Appl. No. 12/029,298, Non-Final Office Action dated Jun. 22, 2010, 11 pages.
In the US Patent and Trademark Office in re: U.S. Appl. No. 12/060,645, Final Office Action dated Apr. 4, 2011, 13 pages.
In the US Patent and Trademark Office in re: U.S. Appl. No. 12/060,645, Final Office Action dated Dec. 12, 2012, 12 pages.
In the US Patent and Trademark Office in re: U.S. Appl. No. 12/060,645, Non-Final Office Action dated Jul. 2, 2012, 10 pages.
In the US Patent and Trademark Office in re: U.S. Appl. No. 12/060,645, Non-Final Office Action dated Nov. 3, 2010, 19 pages.
In the US Patent and Trademark Office in re: U.S. Appl. No. 12/060,662, Final Office Action dated Apr. 4, 2011, 20 pages.
In the US Patent and Trademark Office in re: U.S. Appl. No. 12/060,662, Non-Final Office Action dated Nov. 18, 2010, 26 pages.

(56) References Cited

OTHER PUBLICATIONS

In the US Patent and Trademark Office in re: U.S. Appl. No. 12/060,674, Final Office Action dated Apr. 5, 2011, 19 pages.
In the US Patent and Trademark Office in re: U.S. Appl. No. 12/060,674, Final Office Action dated Jan. 15, 2010, 11 pages.
In the US Patent and Trademark Office in re: U.S. Appl. No. 12/060,674, Non-Final Office Action dated Jul. 9, 2009, 14 pages.
In the US Patent and Trademark Office in re: U.S. Appl. No. 12/060,674, Non-Final Office Action dated Nov. 22, 2010, 13 pages.
In the US Patent and Trademark Office in re: U.S. Appl. No. 12/182,834, Final Office Action dated Nov. 20, 2009, 8 pages.
In the US Patent and Trademark Office in re: U.S. Appl. No. 12/182,834, Non-Final Office Action dated Feb. 8, 2011, 8 pages.
In the US Patent and Trademark Office in re: U.S. Appl. No. 12/423,555, Final Office Action dated Mar. 24, 2010, 9 pages.
In the US Patent and Trademark Office in re: U.S. Appl. No. 12/423,555, Non-Final Office Action dated Nov. 10, 2009, 7 pages.
In the US Patent and Trademark Office in re: U.S. Appl. No. 13/009,579, Final Office Action dated Jul. 3, 2012, 7 pages.
In the US Patent and Trademark Office in re: U.S. Appl. No. 13/009,579, Non-Final Office Action dated Feb. 23, 2012, 6 pages.
In the US Patent and Trademark Office in re: U.S. Appl. No. 13/009,687, Final Office Action dated Jul. 17, 2012, 8 pages.
In the US Patent and Trademark Office in re: U.S. Appl. No. 13/009,687, Non-Final Office Action dated Feb. 22, 2012, 5 pages.
In the US Patent and Trademark Office in re: U.S. Appl. No. 13/224,564, Non-Final Office Action dated Apr. 2, 2012, 8 pages.
In the US Patent and Trademark Office in re: U.S. Appl. No. 13/227,634, Final Office Action dated Mar. 6, 2012, 7 pages.
In the US Patent and Trademark Office in re: U.S. Appl. No. 13/227,634, Non-Final Office Action dated Nov. 29, 2011, 13 pages.
International Search Report issued Aug. 24, 2012, in co-pending application PCT/US2012/044266, 5 pages.
International Search Report issued Dec. 29, 2009 in co-pending application PCT/US09/036158.
International Search Report issued Mar. 21, 2012, in co-pending application PCT/US2011/068110, 4 pages.
International Search Report issued Nov. 6, 2009 in co-pending application PCT/US2009/036155.
Nia et al.; "High Altitude Platform System (HAPS) and Co-existence with Fixed Satellite Service (FSS) in Frequency Range 5850-7075 MHz," *Wireless Communication, Vehicular Technology, Information Theory and Aerospace & Electronic Systems Technology (Wireless VITAE), 2011 2nd International Conference*, 2011; pp. 1-6.
In the US Patent and Trademark Office in re: U.S. Appl. No. 13/107,823, Non-Final Office Action dated Apr. 9, 2013, 11 pages.

* cited by examiner

SYSTEM FOR PROVIDING HIGH SPEED COMMUNICATIONS SERVICE IN AN AIRBORNE WIRELESS CELLULAR NETWORK

FIELD OF THE INVENTION

This invention relates to cellular communications and, in particular, to a system that provides wireless subscriber stations, which are served by an airborne network, with high speed communications service.

BACKGROUND OF THE INVENTION

It is a problem in the field of cellular communications to efficiently and continuously meet the communications requirements of the passengers in multiple aircraft as the aircraft fly their routes and approach/depart airports.

A typical Air-To-Ground cellular communications network (including the Ground-To-Air link) consists of a number of terrestrial (ground) base stations, each of which provides a radio frequency coverage area in a predetermined volume of space, radially arranged around the cell site transmitting antenna. This terrestrial base station uses an antenna pattern which is less sensitive to the reception of ground-originating or ground-reflected signals and which antenna pattern is transmissive only in a skyward direction. The terrestrial base stations are geographically distributed, generally following a typical cellular communications network layout. Terrestrial base stations can also be co-located near airports to enable network coverage when aircraft are on the ground; in this case, the antenna patterns are optimized for terrestrially located aircraft. The boundaries of the coverage area of each terrestrial base station are substantially contiguous with that of neighboring sites so that the composite coverage of all of the terrestrial base stations in the Air-To-Ground cellular communications network generally provides coverage over the targeted area. Terrestrial base stations may provide either a single omni-cell of coverage using transceiver(s) associated with a single transmit and receive antenna system or multiple sectors within the cell of coverage, each with associated transceivers and the associated transmit and receive antennas. The advantage of the latter arrangement, with multiple sectors per terrestrial base station, is to allow provision of increased call handling capacity in the coverage area of that terrestrial base station.

The use of the traditional bidirectional communication channels to serve an aircraft is a limitation on the total radio frequency spectrum available and, therefore, limits the total available call handling capacity in any single cell. Thus, the radio frequency communications link between the aircraft and the terrestrial base stations of the Air-To-Ground cellular communications network has limited capacity, represents a single point of failure, and represents a call handoff problem in terms of call handling capacity of the serving terrestrial cell sites.

In order to increase the capacity, availability, and reliability of a bandwidth constrained wireless Air-To-Ground network, other methods are used to parse the usable spatial and temporal multi-dimensional region where aircraft are operating, such as those taught by the above-noted U.S. patent application Ser. No. 11/590,146. These methods taught in this Multi-Link Aircraft Cellular System include using two substantially orthogonal polarizations to effectively double the capacity of a given spectral allocation. Further, if Walsh code domain separation is added, additional increases in the call handling capacity of the Air-To-Ground cellular communications network are realized.

The implementation of the Multi-Link Aircraft Cellular System makes use of multiple physically separated antennas mounted on the aircraft, as well as the use of additional optional signal isolation and optimization techniques, to improve the call handling capacity of the Air-To-Ground cellular communications network. On the ground, base station antenna pattern shaping in azimuth, in elevation, in altitude, or in multiple planes further segments the multi-dimensional spatial region into multiple sectors, thereby improving system capacity through spatial frequency re-use.

All of the aforementioned capacity enhancement techniques are additive in nature. For example, using substantially orthogonal polarizations together with 6-sector azimuth base station antenna patterns has a linear multiplier effect on overall capacity of that given base station and associated aircraft. When the collective network capacity is considered, the smoothing or balancing of load peaks across multiple nodes provides enhanced peak load management from an overall systems perspective.

Thus, the Air-To-Ground cellular communications network can increase its traffic (data and voice) handling capacity on a per aircraft basis by sharing its traffic load among more than one terrestrial cell or sector and by making use of multiple physically separated antennas mounted on the aircraft and base station antenna pattern sectoring, as well as the use of additional optional signal isolation and optimization techniques such as the use of orthogonal polarizations.

However, even with these improvements, the overall bandwidth available to serve the subscriber wireless devices on the aircraft can be inadequate, especially when the passengers are engaged in high-bandwidth data communication sessions. The transmission of multi-media content to serve the occupants of a commercial airliner, especially with the larger size aircraft, requires a significant bandwidth. Therefore, what is needed is an advance in the art which solves the Air-To-Ground cellular communications network call handling capacity problem and dramatically improves system availability, system reliability, and system capacity.

BRIEF DESCRIPTION OF THE INVENTION

The above-described problems are solved and a technical advance achieved in the field by the present System For Providing High Speed Communications Service In An Airborne Wireless Cellular Network (termed "Broadband Link System" herein).

A bandwidth constrained Air-To-Ground cellular communications network, which uses a bidirectional wireless communication link: Air-To-Ground and Ground-To-Air (collectively termed "Air-To-Ground" herein), can increase its call handling capacity on a per aircraft basis by using a plurality of radio frequencies to simultaneously serve the traffic needs of the aircraft. This previously used process works by simultaneously communicating the aircraft's call traffic through more than one Air-To-Ground Radio Frequency communications link to multiple terrestrial cells or sectors (or sectors of a given cell). For each Radio Frequency spectrum allocation, spreading the call traffic over multiple Air-To-Ground Radio Frequency communications links to multiple terrestrial cells or sectors multiplies the call handling capacity to/from a given aircraft for each additional Radio Frequency link implemented. Equally important, this architecture removes the single point of failure problem occasioned by a single Air-To-Ground Radio Frequency communications link, thereby rendering the network availability of the composite Air-To-Ground Radio Frequency communications link (consisting of multiple Air-To-Ground Radio Frequency links operating on different frequencies) substantially higher and more robust.

The present Broadband Link System departs from the prior solutions by providing a specific implementation of the multiple radio frequency links described in the above-mentioned U.S. Pat. No. 7,113,780 and makes use of an additional, separate high speed Broadband Ground-To-Air Data Channel to provide additional data communication capacity for the aircraft. This Broadband Ground-To-Air Data Channel can be uni-directional (Ground-To-Air) and directed via a focused beam to selected aircraft which are operational in the coverage area of the Broadband Ground-To-Air Data Channel to enable the passengers in the aircraft to retrieve multi-media data without transmission delays while their transmissions to the ground typically are processed by the Air-To-Ground Radio Frequency communications link. Alternatively, the Broadband Ground-To-Air Data Channel can be bi-directional if there is a need for high speed data communications in both directions and if proper spectrum resources are available. The routing of the various data transmissions on both the Air-To-Ground Radio Frequency communications link and the Broadband Ground-To-Air Data Channel are managed in a unified manner to maximize the utilization of the two transmission facilities. Thus, data traffic can be routed as needed to the most cost-effective and delay-free medium as a function of various Quality of Service (QoS) traffic parameters, as well as service subscription level for the associated passenger.

DETAILED DESCRIPTION OF THE INVENTION

The terms "cell site" and "cell" are sometimes loosely used in the literature; and the term "cell site" generally denotes the locations of the Base Transceiver Stations, while the term "cell" generally denotes the region of space which is served by a particular set of transceivers and associated antenna system at a cell site. A "sector" generally refers to the sector-shaped coverage area created when multiple directional antenna systems are used at a cell site to provide greater capacity and/or coverage by subdividing the nominally circular coverage area surrounding a cell site into a corresponding number of cells. The particular technology used to implement the communications between wireless subscriber devices and the transmitter-receiver pairs, as well as the nature of the data transferred there between, be it voice, video, telemetry, computer data, and the like, are not limitations to the system which is described herein, since a novel system concept is disclosed rather than a specific technologically limited implementation of an existing system concept. Therefore, the term "cellular" as it is used herein denotes a communication system which operates on the basis of dividing space into a plurality of volumetric sections or cells, and managing communications between wireless subscriber devices located in the cells and the associated transmitter-receiver pairs located at the cell site for each of these cells.

Overall System Architecture

Figure 1:
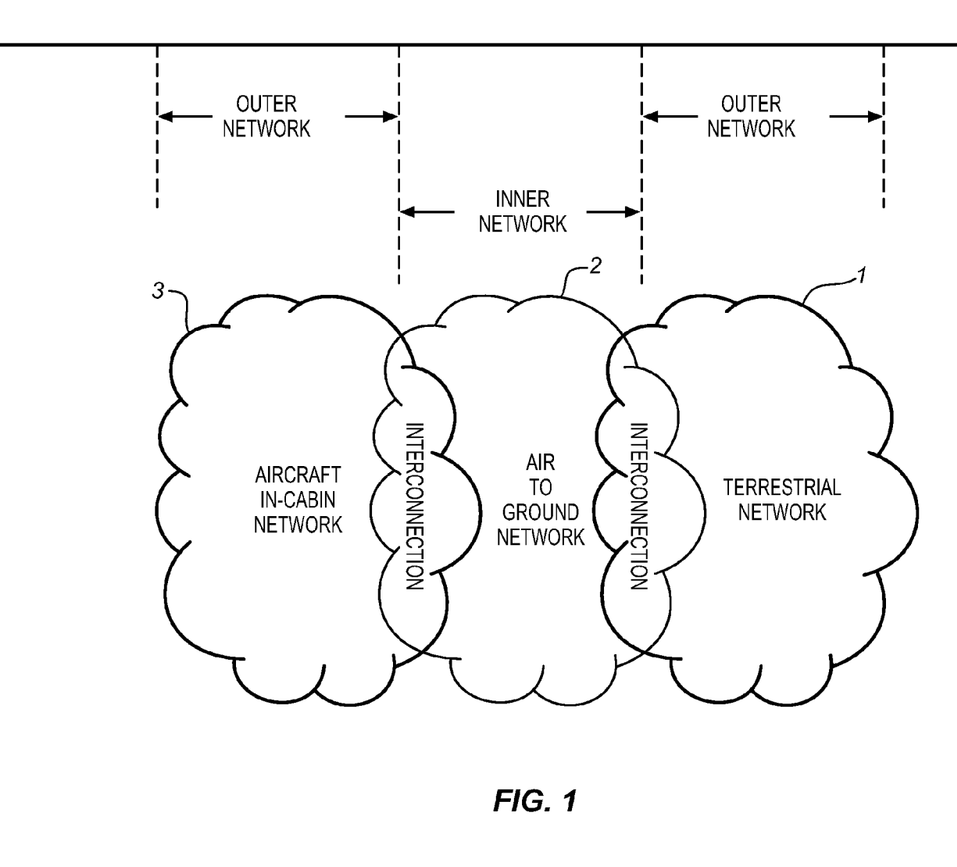
FIG. 1 illustrates, in block diagram form, the overall architecture of a composite air-to-ground network that interconnects an Aircraft In-Cabin Network with a Ground-Based communication network.
Figure 2:
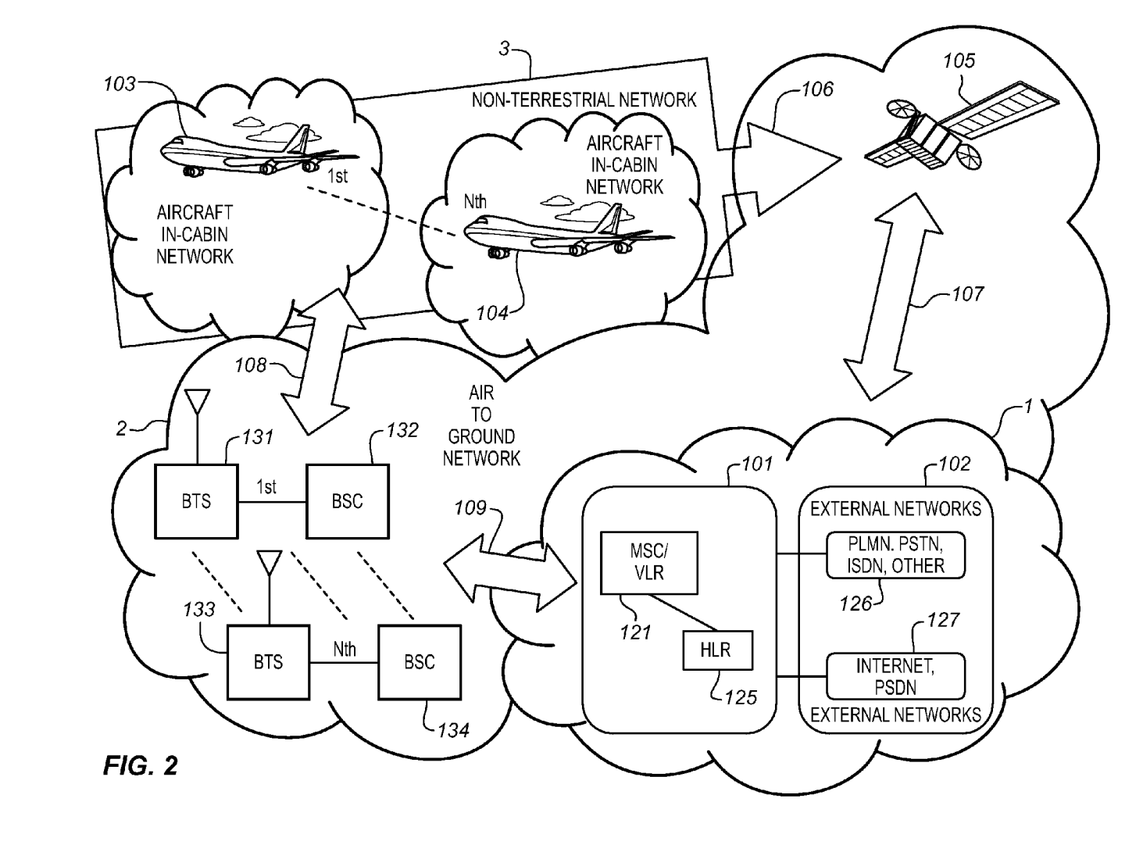
FIG. 2 illustrates, in block diagram form, the key network building blocks for the Air-To-Ground network that interconnects an Aircraft In-Cabin Network with a Ground-Based communication Network.

FIG. 1 illustrates, in block diagram form, the overall architecture of a composite Air-To-Ground Network 2 that interconnects an Aircraft In-Cabin Network 3 with the Terrestrial Network 1; and FIG. 2 illustrates, in block diagram form, the key network building blocks for such a system which provides an Air-To-Ground Network 2 that interconnects an Aircraft In-Cabin Network 3 with a Terrestrial Network 1. These diagrams illustrate the basic concepts of the Air-To-Ground cellular communications network and, for the purpose of simplicity of illustration, do not comprise all of the elements found in a typical network. The fundamental elements disclosed in FIGS. 1 and 2 provide a teaching of the interrelationship of the various elements which are used to implement an Air-To-Ground cellular communications network to provide service to wireless subscriber devices, and additional details of the implementation of such a system are found in the above-mentioned U.S. Pat. No. 7,113,780.

The overall concept illustrated in FIGS. 1 and 2 is that the provision of an "Inner Network" connects the two segments of the "Outer Network," comprising the Aircraft In-Cabin Network 3 and the Terrestrial Network 1. This is accomplished by the Inner Network transmitting both the subscriber traffic (comprising voice and/or other data) and the control information and feature set data between the Aircraft-In-Cabin Network 3 and the Terrestrial Network 1 thereby to enable the wireless subscriber devices that are located in the aircraft 103, 104 to receive services in non-terrestrial regions that are consistent with wireless communication services in the terrestrial (ground-based) networks. The Air-To-Ground Network 2 provides radio access between Aircraft-In-Cabin Network 3 and terrestrial communication infrastructure. This network usually is comprised of a set of Base Transceiver Stations 131, 133 and associated Base Station Controllers 132, 134 that are operated by the Air-To-Ground cellular communications network service provider, and which are connected to the cellular network 101 and then to the wireline network 102 of the ground-based (terrestrial) communication network 1.

The cellular network 101 consists of the traditional elements and, for the purpose of illustration, includes a Mobile Switching Center 121 with its associated Visitor Location Register, which is connected to the Home Location Register 125. The cellular network 101 provides interconnection of the voice traffic to the voice transmission segment of the wireline network 102 which includes various components, including, but not limited to: Public Land Mobile Network, Public Switched Telephone Network, Integrated Services Digital Network, and other such functionalities. The cellular network 101 provides interconnection of the data traffic to the data transmission segments of the wire-line network 102 which includes various components, including, but not limited to: Internet, Public Switched Data Network, and other such functionalities. Implementation of the ground cellular network may not have separated voice and data parts. A preferred implementation is one where voice and data parts are integrated into a single communication network with managed Quality of Service (QoS) attributes for different traffic classes. Such a network typically would be implemented over IP protocol stack with voice service implemented through Voice over IP (VoIP).

Thus, the cellular communications between the wireless subscriber devices located in aircraft 103, 104 and the cellular network 101 and wire-line network 102 segments of the ground-based Communication Network 1 are transported via the Aircraft In-Cabin Network 3 and the Air-To-Ground Network 2 to the ground-based Base Transceiver Stations 131-133 and associated Base Station Controllers 132, 134 of the Air-To-Ground cellular communications network.

Air-To-Ground Network

The Air-To-Ground Network 2 shown in FIGS. 1 and 2 is clearly one that is based on wireless communications (radio frequency or optical) between the ground-based cellular communications network 101 and the wireless subscriber devices that are located in the aircraft 103, 104, with the preferred approach being that of a radio frequency connection 108, 109. This radio frequency connection 108, 109 takes on the form of a cellular topology where typically more than one cell describes the geographic footprint or coverage area of the composite Air-To-Ground Network 2. The Air-To Ground connection carries both subscriber traffic and native network signaling traffic.

Alternatively, the Air-To-Ground Network 2 could be achieved through a wireless satellite connection 105-107 where radio frequency links 106, 107 are established between the aircraft 103, 104 and a satellite 105 and between the satellite 105 and the ground-based cellular communications network 101, respectively. These satellites 105 could be geosynchronous (appears to be stationary from an earth reference point) or moving, as is the case for Medium Earth Orbit (MEO) and Low Earth Orbit (LEO). In the case of specialized satellites, such as those used for Direct Broadcast Satellite, the link is typically unidirectional, that is from the satellite to the receiving platform, in this case an aircraft. In such a system, a link transmitting uni-directionally from the aircraft is needed to make the communication bi-directional. This link could be satellite or ground-based wireless in nature.

The Air-To-Ground Network 2 can be viewed as the conduit through which the subscriber traffic and the control and network feature set data is transported between the Terrestrial Network 1 and the Aircraft-In-Cabin Network 3. The Air-To-Ground Network 2 can be implemented as a single radio frequency link (first frequency band) or multiple radio frequency links, with a portion of the signals being routed over different types of links, such as the Air-To-Ground Link 108 and the Satellite Link 105-107. Thus, there is a significant amount of flexibility in the implementation of this Air-To-Ground Network 2, using the various components and architectural concepts disclosed herein in various combinations.

Call Handling Capacity Enhancement Problem

The issue of capacity enhancement for Air-To-Ground cellular communications networks is an acute problem, since the Air-To-Ground Radio Frequency communications link represents a fixed bandwidth resource. The capacity enhancement problem is even more complex since the Air-To-Ground cellular communications network serves airborne aircraft in a multi-dimensional space which has varying aircraft spatial densities; in particular, in and around airports the aircraft spatial density can be high. These aircraft are flying at high speeds incurring associated Doppler shift as well as time delay associated with large cell radii. The aircraft flight profiles include varying pitch-roll-yaw angles, different altitudes, and different velocities. Each aircraft appears as a single "node" from the perspective of the terrestrial base stations. As a single node, each aircraft, containing possibly hundreds of passengers, appears to the terrestrial base station(s) as a very large capacity, single point network load. Each unique passenger potentially has a wireless device which has specific data and/or voice requirements which, when multiplied by the number of passengers' wireless devices, can generate a significant traffic load on a per aircraft basis. In any given region, there could be tens of aircraft, each individually having a large traffic load, all aircraft in aggregate vying for network resources from the Air-To-Ground cellular communications network through limited frequency bandwidth Air-To-Ground Radio Frequency communications links.

The addition of a high speed Broadband Ground-To-Air Data Channel operating at a second frequency band is capable of supporting high data rates. High data rates transform Air-To-Ground communication services and offer numerous data applications of high value to the flying public, airline industry, and government. Using this example of a typical high speed Broadband Ground-To-Air Data Channel, the following description notes typical issues that must be resolved to implement an operational high speed Broadband Ground-To-Air Data Channel.

Description Of The High Speed Broadband Ground-To-Air Data Channel

Figure 3:
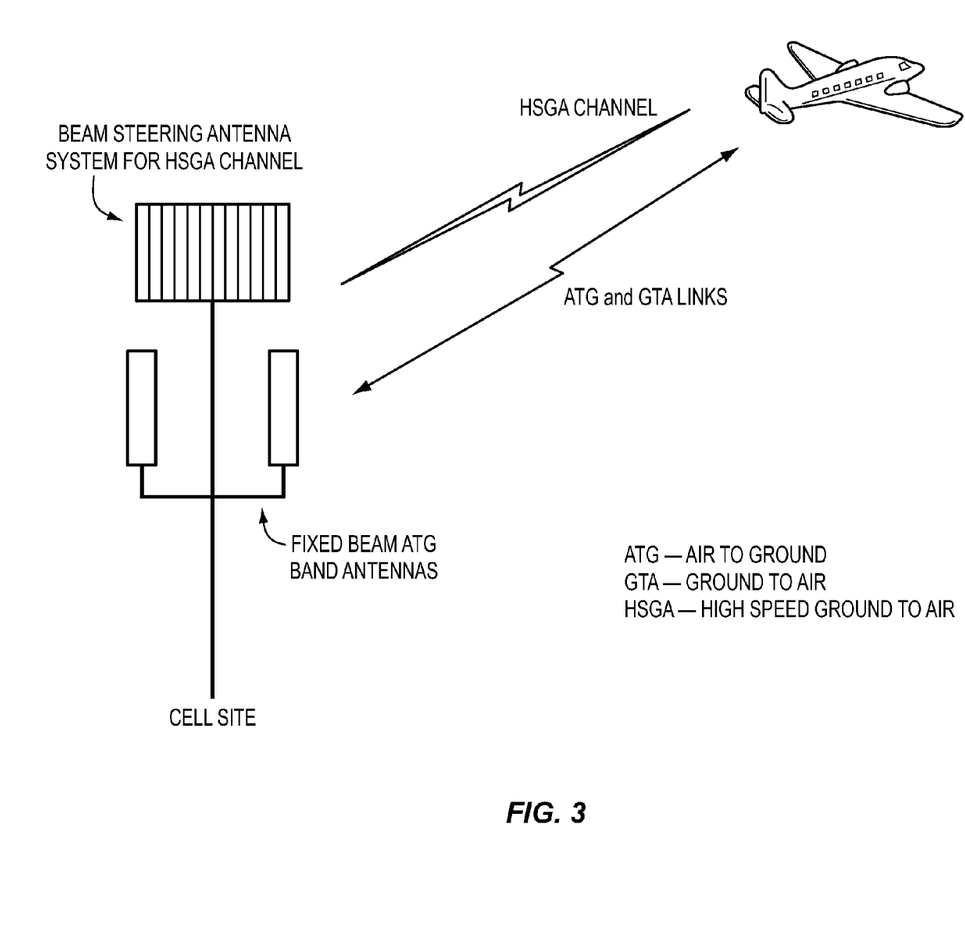
FIG. 3 illustrates, in block diagram form, the air interface for the present Broadband Link System, with a single bi-directional Air-To-Ground Radio Frequency communication link and an associated Broadband Ground-To-Air Data Channel.
Figure 4:
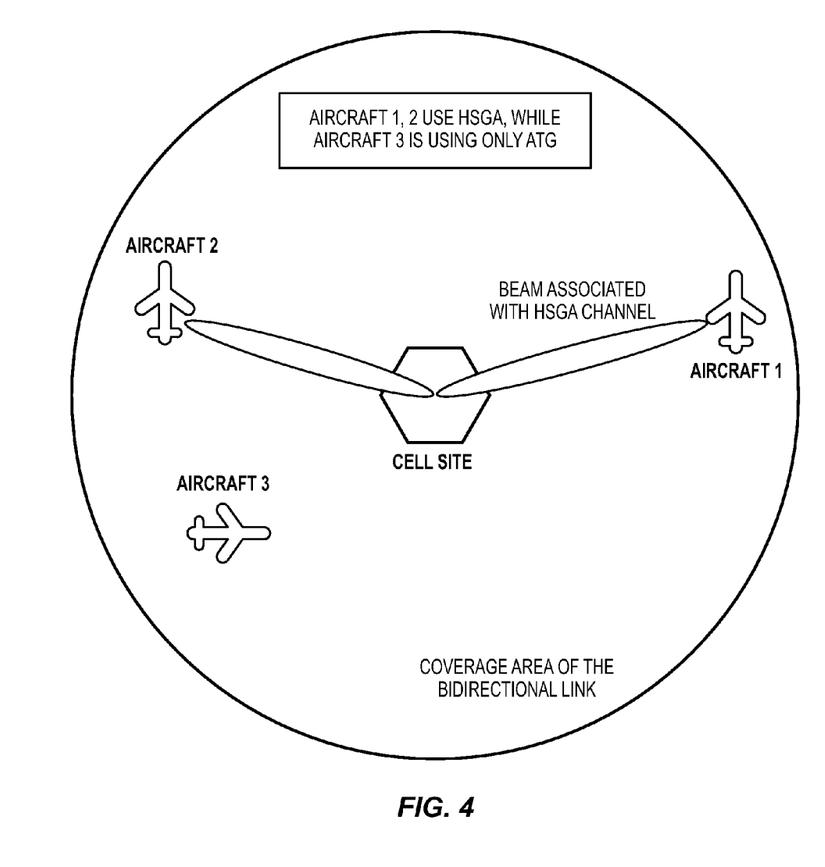
FIG. 4 illustrates, in block diagram form, a typical antenna coverage pattern for a single bi-directional Air-To-Ground Radio Frequency communication link and an associated Broadband Ground-To-Air Data Channel as used to serve a plurality of aircraft which are operational in the coverage area of the single bi-directional Air-To-Ground Radio Frequency communication link of FIG. 3.

The overview of the air interface organization for the high speed Broadband Ground-To-Air Data Channel is presented in FIG. 3, where essentially two different data communication links are used to support data communications with the aircraft. The first link is bi-directional, and it supports the present Air-To-Ground Radio Frequency communications link in the allocated Air-To-Ground frequency band (first frequency band). The other link is a uni-directional high speed Broadband Ground-To-Air Data Channel that operates in a second frequency band. The summary of the frequency allocation in two bands is provided in Table 1, as shown below.

TABLE 1

Spectrum allocation for the communication links

| Link | Use |
|---|---|
| ATG ground to plane | Network access, mobility management, radio resource control, and broadband data |
| ATG plane to ground | Network access, mobility management, radio resource control, and broadband data |
| Broadband | High speed broadband data in ground to air direction |

The bi-directional Air-To-Ground Radio Frequency communications link is used to provide broadband data services and for mobility and radio resource management functions. For example, this link may be based on 1xEvDO Rev A standard, which is 1.25 MHz wide CDMA technology. The bi-directional link utilizes fixed beam antennas (either omni-directional or sectored) and provides blanket area coverage similar to that of a traditional terrestrial cellular system. An aircraft entering the coverage area of the Air-To-Ground Radio Frequency communications link detects the pilot signal of this link, and it registers and accesses the Air-To-Ground cellular communications network through the Air-To-Ground portion of this Air-To-Ground Radio Frequency communications link. In addition to user traffic, the Air-To-Ground portion of this network carries resource allocation and mobility management traffic associated with the high speed Broadband Ground-To-Air Data Channel.

The high speed Broadband Ground-To-Air Data Channel is managed in a different manner than the Air-To-Ground Radio Frequency communications link. Based on the throughput requirements of the aircraft in the Ground-To-Air direction, the Air-To-Ground cellular communications network may 'decide' to utilize the Broadband Ground-To-Air Data Channel. The communication on this Broadband Ground-To-Air Data Channel is conducted through a separate antenna system that supports narrow beam steering. In this manner, the energy radiation in the HSGA band is tightly controlled and directed very narrowly towards the serviced aircraft as is illustrated in FIG. 3, where the Broadband Ground-To-Air Data Channel is implemented for Aircraft 1 and 2.

Therefore, the Broadband Ground-To-Air Data Channel is allocated only as a result of the resource management procedure and to aircraft that require high data rate throughput. The feedback channel required for the radio resource management of the Broadband Ground-To-Air Data Channel is provided through the Air-To-Ground link of the Air-To-Ground Radio Frequency communications link.

The effective deployment of the Broadband Ground-To-Air Data Channel on the top of the existing Air-To-Ground Radio Frequency communications link requires that the power budgets between the two links match. In other words, if an aircraft within the service area of existing Air-To-Ground Radio Frequency communications link demands a high data throughput, it should be reachable by the Broadband Ground-To-Air Data Channel of the Air-To-Ground cellular communications network.

The Broadband Ground-To-Air Data Channel needs to be able to match the coverage of the Air-To-Ground Radio Frequency communications link. Due to higher operating frequency, the path losses in the second frequency band are substantially higher. To overcome the losses, the Broadband Ground-To-Air Data Channel uses high gain beam steering antennas on both ends of the communication link. In addition, the following factors are considered in implementing the Broadband Ground-To-Air Data Channel:

1. The aircraft antenna needs to have a gain of at least 10 dB whenever the noise rise due to the ground transmitters of other networks is less than 3 dB.
2. In some cases, noise rise due to the interference from ground elements can be as high as 10 dB to 25 dB. In order to reject this interference, the array of antennas mounted on the aircraft minimizes the effect of this interference. This means that the aircraft antenna needs to have very small side lobes and a large main lobe gain.
3. To guarantee high selectivity, small-pattern side lobes and to ensure that the serving ground site is always in the aircraft antenna's main beam, the aircraft antenna needs to be implemented as a steerable beam antenna. The beam steering implementation in Air-To-Ground settings is a relatively easy task since the locations of the ground stations as well as the location of the aircraft are known with great accuracy. Therefore, the beam steering algorithm may calculate gains of the individual array elements in an almost closed form solution manner. Furthermore, due to stability of the Air-To-Ground channel, the tracking of the base station location as the aircraft moves can be accomplished with relative ease.

Design Of Aircraft Antenna

Thus, the interference from other systems to the aircraft typically produces much higher than the 3 dB noise rise whenever the airplane is in the vicinity of a populated (typically metropolitan area). In this case, base stations typically are sited 150 miles (about 230 km) away from the center of the population. Typical metropolitan areas can be assumed to have a radius of 100 km. The airplane in this case can be assumed to be at an elevation of 30,000 ft=9 km. These parameters result in a calculated noise rise due to interference which can be as high as 20 dB to 25 dB. The aircraft antenna array then must point to a distant base station at 230 km, and attenuate the interference from the ground to levels about 3 dB above the thermal noise.

A simple computation shows that the beam angle to the base station from the vertical line from the plane to the surface of earth is about 87.75 degrees. Thus, the antenna element beam pattern must be steered toward this direction. The interfering signals are limited to −84.28 to +84.28 degrees.

Base Station Antenna Requirements And Contention Zones

According to the link budget analysis, the EIRP from the Broadband Ground-To-Air Data Channel base station antennas may be somewhat larger than what is usually allowed in the unlicensed frequency bands. However, one needs to keep in mind that the regulatory transmitter power management rules are formulated so that they allow deployment of ground base stations that provide service to mobile terrestrial users. The deployment is largely unrestricted except for exclusion zones surrounding the grandfathered systems. Since base stations serve mobile terrestrial users, they are predominantly deployed in populated areas with a real possibility of more than one system operating within the band. On the other hand, deployment of the Broadband Ground-To-Air Data Channel is quite different. Since the service is provided to flying aircraft, the location of the base stations can be selected in the areas of very low population density. This way, the Broadband Ground-To-Air Data Channel has a very limited impact on the utilization of the band throughout the country. Furthermore, the Broadband Ground-To-Air Data Channel base stations would utilize beam steering antennas with a high level of discrimination in both horizontal and vertical planes which wilt even further reduce the impact on other users in the band. As a result, the coexistence of the high speed Broadband Ground-To-Air Data Channel with other users of the unlicensed spectra is easily achieved.

Figure 5:
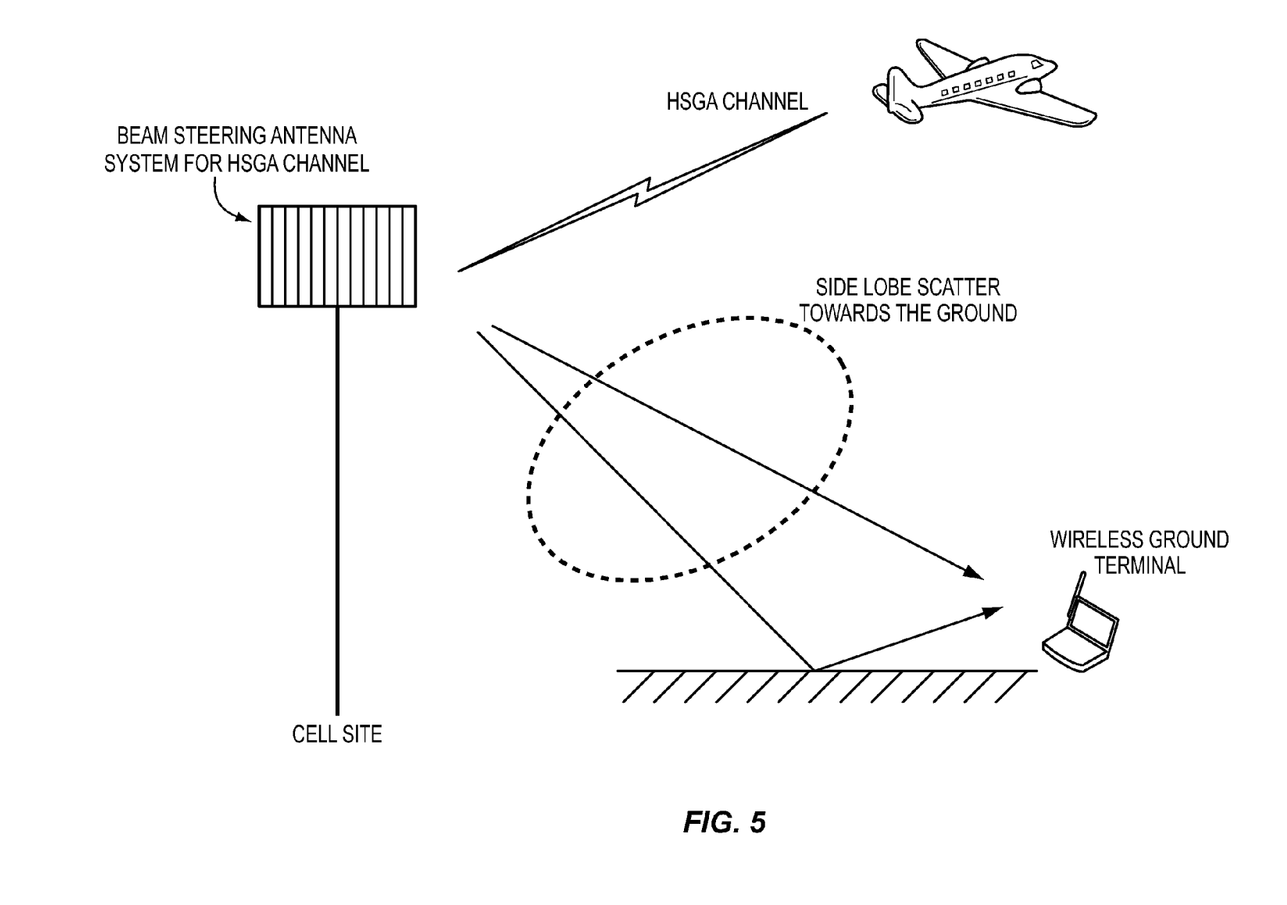
FIG. 5 illustrates, in block diagram form, the interference potential from the Broadband Ground-To-Air Data Channel to cellular devices located on the ground.
Figure 6:
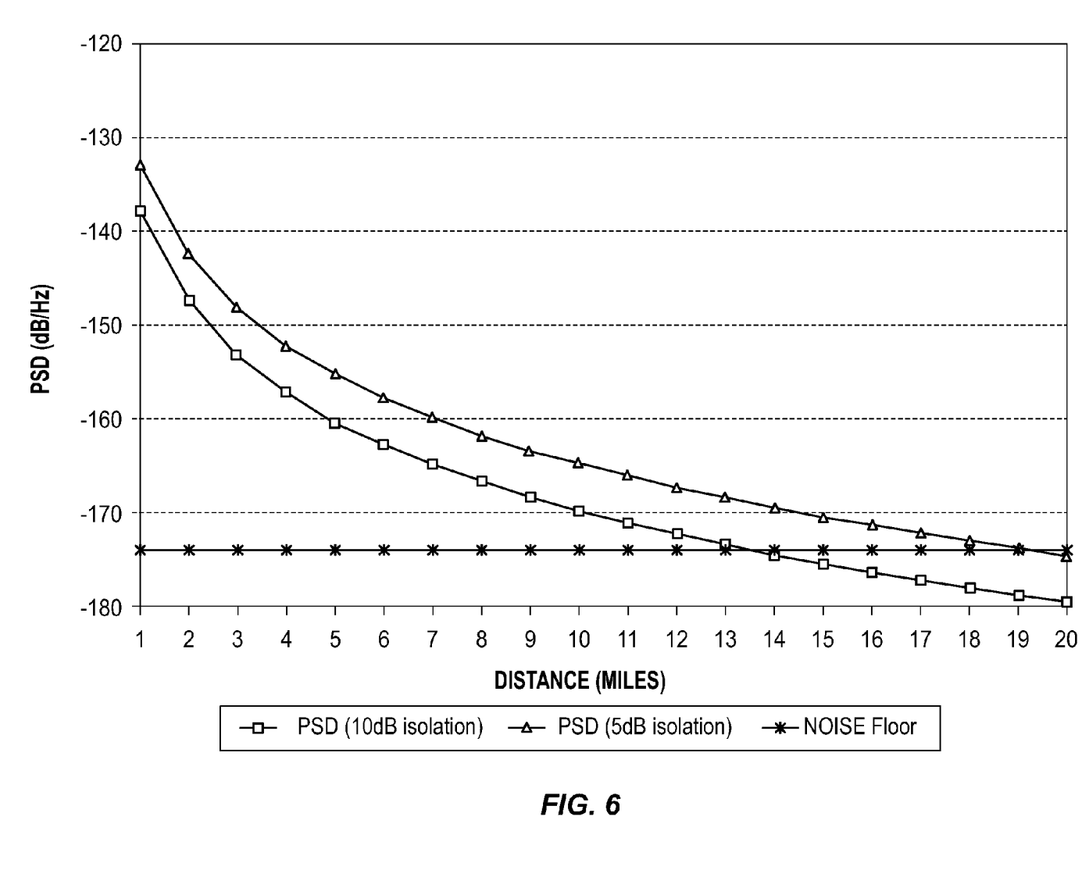
FIG. 6 illustrates in graphical form the power density of an interfering signal from the Broadband Ground-To-Air Data Channel as a function of distance.

To examine the impact of the Broadband Ground-To-Air Data Channel base station installation, consider the situation depicted in FIG. 5. The signal from the Broadband Ground-To-Air Data Channel link side lobe scatter may interfere with other ground systems operating in the same band. In the figure, the interference to the mobile devices is shown, but interference may be introduced to ground base stations of other systems as well. The extent of the interference signal power density is a function of distance and for different beam steering antenna isolation values as shown in FIG. 6. The isolation value is defined as a difference in gain between the main beam and the aggregate gain of the side lobe scatter. The curves are generated assuming the path loss exponent of 3.2 (i.e., path loss slope of 32 dB/dec).

It is observed that, for a given isolation value, there is a separation distance after which the interference from the Broadband Ground-To-Air Data Channel link scatter falls below the thermal noise floor. From FIG. 6, this distance may be estimated as 9.5, 13.5, and 19.5 miles for isolation values of 15 dB, 10 dB, and 5 dB respectively. Within proximity of the Broadband Ground-To-Air Data Channel installation, the system employs a contention protocol that allows its coexistence with other systems in the band.

Contention Based Protocol Description

Since the present example illustrates transmission on the second frequency band only in the forward link, a contention based algorithm is outlined for the base station. The forward link of the Air-To-Ground cellular communications network is based on multi-carrier communications. However, the proposed protocol can be implemented using any transmission scheme based on time-frequency resource blocks (referred to as chunks).

In the Air-To-Ground cellular communications network, the base station starts the transmission on a number of sub-carriers (or more generally time-frequency resource blocks) covering the entire intended transmission bandwidth (e.g., 10 MHz). The sub-carriers (or more generally time-frequency resource blocks) corresponding to this band are called sub-carriers of interest. Each base station periodically senses the environment. Any base station calls a sub-carrier (or more generally a time-frequency resource block) busy at time t, if
  a) It is a sub-carrier of interest,
  b) It was used for transmission at time t−1, and
  c) The base station detects activity (from other potential transmitters) on that sub-carrier at that time.
A sub-carrier is called idle (for a given base station) at time t if
  d) It is a sub-carrier of interest,
  e) It was not used for transmission at time t−1, and
  f) The base station does not detect activity (from other potential transmitters) on that sub-carrier at time t.
The following contention protocol can be used in this case although other variants of this protocol are also possible. Each base station is given a back-off parameter $0<r<1$ and a capture parameter $0<s<1$. At each time t, the base-station
  g) Refrains from transmission of each busy sub-carrier with probability r, and
  h) Chooses each idle sub-carrier with probability s.
One can prove using Markov decision theory that
  i) The above contention protocol is stable, and
  j) It is more accommodating to other networks transmissions than CSMA and its variants. In fact, if a greedy adversary starts continuous transmission in the band of interest without practicing any courtesy, then it is easy to see that this protocol forces the base stations to completely refrain from transmission.
Property (j) makes this protocol the most courteous of all contention based protocols that are commonly employed in practice. However, since it is very unlikely (due to the choice of locations of our proposed base stations) that other transmitting agents are present near the transmitters, it is expected that the system is able to provide high speed Air-To-Ground communications despite being so over-courteous.

SUMMARY

The present Broadband Link System makes use of an additional, separate high speed Broadband Ground-To-Air Data Channel to provide additional data communication capacity for the aircraft. This Broadband Ground-To-Air Data Channel can be uni-directional (Ground-To-Air) to enable the passengers in the aircraft to retrieve multi-media data without transmission delays while their transmissions to the ground typically are processed by the Air-To-Ground Radio Frequency communications link.

The invention claimed is:

1. A system for providing wireless communication services to wireless subscriber devices that are located in an aircraft that is operational in a selected coverage area, comprising:
   a ground-based communications network having a plurality of base stations located on the ground, each of which operates at least one transceiver to create a coverage area that provides wireless communication services to wireless subscriber devices that are located in an aircraft that is operational in the coverage area, comprising:
      Air-To-Ground Radio Frequency transceiver for providing at least one bidirectional radio frequency communication link, operating at a first radio frequency band and having a first bandwidth, for transmitting network access signals, mobility management signals, and data communications signals between the aircraft and the at least one transceiver to enable the wireless subscriber devices located in the aircraft to bidirectionally communicate with the Internet over the bidirectional radio frequency communication link, and
      Broadband Ground-To-Air Data Channel transmitter for dynamically establishing at least one Ground-To-Air Radio Frequency communications link, operating at a second radio frequency band which has a second bandwidth which is greater than the first bandwidth, for transmitting data communications signals to the aircraft to supplement the first bandwidth provided by the at least one bidirectional radio frequency communication link between the aircraft and the at least one transceiver.

2. The system for managing radio frequency communications of claim 1 wherein the Broadband Ground-To-Air Data Channel transmitter comprises:
   radio frequency antenna means for creating at least one steered directional radio frequency beam that is directed to the aircraft.

3. The system for managing radio frequency communications of claim 2 wherein the base station further comprises:
   data routing means, responsive to communications signals received for delivery to the aircraft, for activating the Broadband Ground-To-Air Data Channel transmitter to create the at least one steered directional radio frequency beam that is directed to the aircraft to transmit the received communications signals to the aircraft.

4. The system for managing radio frequency communications of claim 1 wherein the base station further comprises:
   data routing means, responsive to communications signals received for delivery to the aircraft, for dividing the communication signals between the Air-To-Ground Radio Frequency transceiver and the Broadband Ground-To-Air Data Channel transmitter when the data throughput requirement of the aircraft is greater than can be served by the Air-To-Ground Radio Frequency transceiver.

5. The system for managing radio frequency communications of claim 1 wherein the base station further comprises:
   contention protocol means for managing the concurrent delivery of the communications signals on the Broadband Ground-To-Air Data Channel transmitter to a plurality of aircraft.

6. The system for managing radio frequency communications of claim 5 wherein the Broadband Ground-To-Air Data Channel transmitter implements a plurality of carrier signals, and the contention protocol means comprises:
   busy carrier means for periodically placing a busy one of the carrier signals in an idle state to enable an idle one of the carrier signals to be selected for transmission.

7. The system for managing radio frequency communications of claim 1 wherein the second radio frequency of the Broadband Ground-To-Air Data Channel transmitter is higher than the first radio frequency of the Air-To-Ground Radio Frequency transceiver.

8. A method for providing wireless communication services to wireless subscriber devices that are located in an aircraft that is operational in a selected coverage area, via a ground-based communications network having a plurality of base stations located on the ground, each of which operates at least one transceiver to create a coverage area that provides wireless communication services to wireless subscriber devices that are located in an aircraft that is operational in the coverage area, comprising:
    providing at least one bidirectional Air-To-Ground Radio Frequency link, operating at a first radio frequency band and having a first bandwidth, for transmitting network access signals, mobility management signals, and data communications signals between the aircraft and the at least one transceiver to enable the wireless subscriber devices located in the aircraft to bidirectionally communicate with the Internet over the bidirectional radio frequency communication link; and
    establishing at least one Ground-To-Air Radio Frequency communications link, operating at a second radio frequency band and having a second bandwidth which is greater than the first bandwidth, with selected ones of the aircraft for transmitting data communications signals to the aircraft to supplement the first bandwidth provided by the at least one bidirectional radio frequency communication link between the aircraft and the at least one transceiver.

9. The method for managing radio frequency communications of claim 8 wherein the step of establishing at least one Broadband Ground-To-Air Radio Frequency communications link comprises:
    creating at least one steered directional radio frequency beam that is directed to the aircraft.

10. The method for managing radio frequency communications of claim 9, further comprising:
    activating, in response to communications signals received for delivery to the aircraft, the step of establishing at least one Broadband Ground-To-Air Radio Frequency communications link to create the at least one steered directional radio frequency beam that is directed to the aircraft to transmit the communications signals from the transceiver to the aircraft.

11. The method for managing radio frequency communications of claim 8, further comprising:
    dividing, in response to communications signals received for delivery to the aircraft, the communication signals between the Air-To-Ground Radio Frequency link and the Ground-To-Air Radio Frequency communications link when the data throughput requirement of the aircraft is greater than can be served by the Air-To-Ground Radio Frequency link.

12. The method for managing radio frequency communications of claim 8, further comprising:
    managing the concurrent delivery of the communications signals on the Ground-To-Air Radio Frequency communications link to a plurality of aircraft.

13. The method for managing radio frequency communications of claim 12 wherein the Ground-To-Air Radio Frequency communications link implements a plurality of carrier signals, and the step of managing comprises:
    periodically placing a busy one of the carrier signals in an idle state to enable an idle one of the carrier signals to be selected for transmission.

14. A system for providing wireless communication services to wireless subscriber devices that are located in a plurality of aircraft that are operational in a selected coverage area, comprising:
    a ground-based communications network having a plurality of base stations located on the ground, each of which operates at least one transceiver to create a coverage area that provides wireless communication services to wireless subscriber devices that are located in a plurality of aircraft that are operational in the coverage area, comprising:
        Air-To-Ground Radio Frequency transceiver for providing bidirectional radio frequency communication links, operating at a first radio frequency band and having a first bandwidth, for transmitting network access signals, mobility management signals, and data communications signals between each of the aircraft and the transceiver to enable the wireless subscriber devices located in the aircraft to bidirectionally communicate with the Internet over the bidirectional radio frequency communication link, and
        Broadband Ground-To-Air Data Channel transmitter for dynamically establishing at least one Ground-To-Air Radio Frequency communications link, operating at a second radio frequency band which has a second bandwidth which is greater than the first bandwidth, with selected ones of the aircraft for transmitting data communications signals to the selected aircraft to supplement the first bandwidth provided by the at least one bidirectional radio frequency communication link between the aircraft and the at least one transceiver.

15. The system for managing radio frequency communications of claim 14 wherein the Broadband Ground-To-Air Data Channel transmitter comprises:
    radio frequency antenna means for creating at least one steered directional radio frequency beam that is directed to each of the selected aircraft.

16. The system for managing radio frequency communications of claim 15 wherein the base station further comprises:
    data routing means, responsive to communications signals received for delivery to the aircraft, for activating the Broadband Ground-To-Air Data Channel transmitter to create the at least one steered directional radio frequency beam that is directed to each of the selected aircraft to transmit the communications signals from the transceiver to each of the selected aircraft.

17. The system for managing radio frequency communications of claim 14 wherein the base station further comprises:
    data routing means, responsive to communications signals received for delivery to the aircraft, for dividing the communication signals between the Air-To-Ground Radio Frequency transceiver and the Broadband Ground-To-Air Data Channel transmitter when the data throughput requirement of the aircraft is greater than can be served by the Air-To-Ground Radio Frequency transceiver.

18. The system for managing radio frequency communications of claim 14 wherein the base station further comprises:

contention protocol means for managing the concurrent delivery of the communications signals on the Broadband Ground-To-Air Data Channel transmitter to a plurality of aircraft.

19. The system for managing radio frequency communications of claim 18 wherein the Broadband Ground-To-Air Data Channel transmitter implements a plurality of carrier signals, and the contention protocol means comprises:

busy carrier means for periodically placing a busy one of the carrier signals in an idle state to enable an idle one of the carrier signals to be selected for transmission.

20. The system for managing radio frequency communications of claim 14 wherein the second radio frequency band of the Broadband Ground-To-Air Data Channel transmitter is higher than the first radio frequency band of the Air-To-Ground Radio Frequency transceiver.

21. A method for providing wireless communication services to wireless subscriber devices that are located in a plurality of aircraft that are operational in a selected coverage area, via a ground-based communications network having a plurality of base stations located on the ground, each of which operates at least one transceiver to create a coverage area that provides wireless communication services to wireless subscriber devices that are located in a plurality of aircraft that are operational in the coverage area, comprising:

providing at least one bidirectional Air-To-Ground Radio Frequency link, operating at a first radio frequency band and having a first bandwidth, for transmitting network access signals, mobility management signals, and data communications signals between each of the aircraft and the transceiver to enable the wireless subscriber devices located in the aircraft to bidirectionally communicate with the Internet over the bidirectional radio frequency communication link; and establishing at least one Ground-To-Air Radio Frequency communications link, operating at a second radio frequency band which has a second bandwidth which is greater than the first bandwidth, with selected ones of the aircraft for transmitting data communications signals to the aircraft to supplement the first bandwidth provided by the at least one bidirectional radio frequency communication link between the aircraft and the at least one transceiver.

22. The method for managing radio frequency communications of claim 21 wherein the step of establishing at least one Broadband Ground-To-Air Radio Frequency communications link comprises:

creating at least one steered directional radio frequency beam that is directed to each of the selected aircraft.

23. The method for managing radio frequency communications of claim 22, further comprising:

activating, in response to communications signals received for delivery to the aircraft, the step of establishing at least one Broadband Ground-To-Air Radio Frequency communications link to create the at least one steered directional radio frequency beam that is directed to each of the selected aircraft to transmit the communications signals from the transceiver to each of the selected aircraft.

24. The method for managing radio frequency communications of claim 21, further comprising:

dividing, in response to communications signals received for delivery to the aircraft, the communication signals between the Air-To-Ground Radio Frequency link and the Ground-To-Air Radio Frequency communications link when the data throughput requirement of the aircraft is greater than can be served by the Air-To-Ground Radio Frequency link.

25. The method for managing radio frequency communications of claim 21, further comprising:

managing the concurrent delivery of the communications signals on the Ground-To-Air Radio Frequency communications link to a plurality of aircraft.

26. The method for managing radio frequency communications of claim 25 wherein the Ground-To-Air Radio Frequency communications link implements a plurality of carrier signals, and the step of managing comprises:

periodically placing a busy one of the carrier signals in an idle state to enable an idle one of the carrier signals to be selected for transmission.

* * * * *